(12) United States Patent
Nakade et al.

(10) Patent No.: US 8,577,567 B2
(45) Date of Patent: Nov. 5, 2013

(54) VEHICLE CONTROL DEVICE

(75) Inventors: Yusuke Nakade, Toyota (JP); Atsushi Kamada, Miyoshi (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 350 days.

(21) Appl. No.: 13/054,436

(22) PCT Filed: Jul. 10, 2009

(86) PCT No.: PCT/JP2009/062638
§ 371 (c)(1),
(2), (4) Date: Jan. 14, 2011

(87) PCT Pub. No.: WO2010/007957
PCT Pub. Date: Jan. 21, 2010

(65) Prior Publication Data
US 2011/0112736 A1    May 12, 2011

(30) Foreign Application Priority Data
Jul. 15, 2008    (JP) .................. 2008-184310

(51) Int. Cl.
*G06F 7/00* (2006.01)
(52) U.S. Cl.
USPC ................. 701/58; 477/34; 477/110
(58) Field of Classification Search
USPC ................... 701/58, 51; 477/34, 110
See application file for complete search history.

(56) References Cited

U.S. PATENT DOCUMENTS

| 2004/0053743 A1 | 3/2004 | Tsuzuki et al. |
| 2006/0081085 A1* | 4/2006 | Otsuka et al. ............... 74/473.21 |
| 2007/0087896 A1* | 4/2007 | Matsuzaki et al. ............ 477/107 |

FOREIGN PATENT DOCUMENTS

| JP | 06-213025 A | 8/1994 |
| JP | 2004-052819 A | 2/2004 |
| JP | 2006-335157 A | 12/2006 |
| JP | 2006-336717 A | 12/2006 |
| JP | 2008-024100 A | 2/2008 |

OTHER PUBLICATIONS

Japanese Office Action for corresponding JP Patent Application No. 2008-184310 mailed Jul. 12, 2011.

* cited by examiner

*Primary Examiner* — Thomas Black
*Assistant Examiner* — Luke Huynh
(74) *Attorney, Agent, or Firm* — Sughrue Mion, PLLC

(57) ABSTRACT

A vehicle control device having a shift-by-wire system that switches a driving range of a vehicle transmission by inputting a range switching signal to a shift switching device, includes: an abnormality detecting means that detects an abnormality that the shift switching device cannot switch the driving range, of the shift-by-wire system; and a driving force suppressing means that suppresses a driving force of a vehicle when an abnormality is detected in the shift-by-wire system and when a vehicle stop is predicted, and the driving force suppressing means switching a gear stage of the vehicle transmission to a higher-speed gear stage.

8 Claims, 6 Drawing Sheets

| | C1 | C2 | B1 | B2 | B3 |
|---|---|---|---|---|---|
| 1st | ○ | | | ○ | |
| 2nd | ○ | | ○ | | |
| 3rd | ○ | | | | ○ |
| 4th | ○ | ○ | | | |
| 5th | | ○ | | | ○ |
| 6th | | ○ | ○ | | |
| Rev | | | | ○ | ○ |

VEHICLE CONTROL DEVICE

TECHNICAL FIELD

The present invention relates to a vehicle control device having a so-called shift-by-wire system that switches a driving range of a transmission by inputting a range switching signal to a shift switching device, and more particularly, to a control provided when an abnormality is detected in the shift-by-wire system.

BACKGROUND ART

A vehicle is known that has a so-called shift-by-wire system that switches a driving range of a vehicle by converting a driver's operation of a shift lever into an electrical signal and by driving, based on the electrical signal, an actuator acting as a shift switching device. Since the shift-by-wire system has no physical (mechanical) relationship of connection between the shift lever and a transmission as seen in the prior art, even when an abnormality incapable of, e.g., switching between forward and reverse movements occurs in the shift-by-wire system, the driver cannot notice the abnormality. Hence, for instance, when an abnormality occurs in the shift-by-wire system upon running at "D" range that is a forward driving range and thereafter an operation of switching to "R" range is made by the driver in accordance with the driver's intention of switching to "R" range that is a reverse driving range, the actual driving range of the transmission may still remain at "D" range (a forward-reverse movement malfunction) even when the shift lever is operated to a position of "R" range. In this case, the driver may consider that switching to "R" range is completed due to the operation of the shift lever to the position of "R" range, as a result of which the vehicle may possibly move forward when the driver steps on an accelerator. This is the reason why the shift-by-wire system includes a means for detecting such an abnormality thereof.

A shift-by-wire control device described in Patent Document 1 for example includes a plurality of shift-by-wire control circuits, a monitoring control means configured to be constituted of another control circuit than the shift-by-wire control circuits, for monitoring the shift-by-wire control circuits, and a permission/prohibition means for individually permitting or prohibiting control executed by the plurality of shift-by-wire control circuits based on a command from the monitoring control means. In a case where an abnormality occurs in one or some of the plurality of shift-by-wire control circuits, the monitoring control means distinguishes an abnormal shift-by-wire control circuit(s) from a normal shift-by-wire control circuit(s) so as to enable detection of an abnormality in the shift-by-wire system. Based on a result of distinguishment of the monitoring control means, the permission/prohibition means permits the continuation of the control for the normal shift-by-wire control circuit(s) and prohibits the control for the abnormal shift-by-wire control circuit(s). In such a case, the monitoring control means imposes an output limitation on the vehicle, e.g., by lowering the engine torque or by applying the brake.

PRIOR ART DOCUMENTS

Patent Document

Patent Document 1: Japanese Laid-Open Patent Publication No. 2006-335157

SUMMARY OF THE INVENTION

Problems to be Solved by the Invention

Patent Document 1 involves a problem that the driver may experience an inconvenience since the output limitation also remains continued similarly during the time when the abnormality in the shift-by-wire system goes on. However, in case of not imposing the output limitation, in particular, when an abnormality (the forward-reverse movement malfunction) occurs that the driving range is switched to a vehicle running direction different from a direction instructed by the driver, the driver may have a sense of incongruity. The patent document 1 does not examine how to define the time to start and end the output limitation and not disclose specific measures at all.

The present invention was conceived in view of the above circumstances, and an object thereof is to provide a vehicle control device having a shift-by-wire system in which a vehicle driving force is properly suppressed when an abnormality is detected in the shift-by-wire system.

Means for Solving the Problems

To achieve the above object, the first aspect of the present invention provides (a) a vehicle control device having a shift-by-wire system that switches a driving range of a vehicle transmission by inputting a range switching signal to a shift switching device, including: (b) an abnormality detecting means that detects an abnormality of the shift-by-wire system; and (c) a driving force suppressing means that suppresses a driving force of a vehicle when an abnormality is detected in the shift-by-wire system and when a vehicle stop is predicted.

The second aspect of the invention provides the vehicle control device recited in the first aspect of the invention, wherein a prediction of the vehicle stop is made when a vehicle speed is a predetermined value or below.

The third aspect of the invention provides the vehicle control device recited in the first aspect of the invention, wherein a prediction of the vehicle stop is made when a brake is ON-operated.

The 4th aspect of the invention provides the vehicle control device recited in the first aspect of the invention, wherein a prediction of the vehicle stop is made when a vehicle deceleration is a predetermined value or above.

The 5th aspect of the invention provides the vehicle control device recited in the first aspect of the invention, wherein the driving force suppressing means switches a gear stage of the vehicle transmission to a higher-speed gear stage.

The 6th aspect of the invention provides the vehicle control device recited in the first aspect of the invention, wherein the driving force suppressing means cancels the suppression of the driving force of the vehicle when a restart of the vehicle is predicted.

The 7th aspect of the invention provides the vehicle control device recited in the 6th aspect of the invention, wherein a prediction of the restart of the vehicle is made when a vehicle speed of the vehicle is a predetermined value or above.

The 8th aspect of the invention provides the vehicle control device recited in the 6th aspect of the invention, comprises that the prediction of the restart of the vehicle is made when an accelerator opening is a predetermined value or above.

The 9th aspect of the invention provides the vehicle control device recited in the 6th aspect of the invention, wherein a prediction of the restart of the vehicle is made when a brake is OFF-operated.

The Effects of the Invention

According to a vehicle control device of the first aspect of the present invention, in cases where an abnormality is detected in the shift-by-wire system and where a vehicle stop is predicted, the suppression of the driving force is carried out only when the vehicle stop is predicted, due to the provision of the driving force suppressing means for suppressing the vehicle driving force. The vehicle forward/reverse movement switching operation may be performed when the vehicle is in standstill. By virtue of the suppression of the vehicle driving force by the driving force suppression means, however, even when the forward/reverse movement switching malfunction occurs due to an abnormality of the shift-by-wire system when the forward/reverse movement switching operation is performed, the startup of the vehicle becomes dull and the vehicle movement is hardly caused by the forward/reverse movement malfunction in spite of the driver's depression of the accelerator. Therefore, this enables the driver to notice the abnormality while suppressing the vehicle movement to a minimum. Furthermore, when the vehicle stop is not predicted, the vehicle driving force is not suppressed with a determination that the forward/reverse movement switching operation is not performed so that the running state continues, to thereby prevent lowering of vehicle driving performance attributable to a reduction of the driving force.

According to the vehicle control device of the second aspect of the invention, the prediction of the vehicle stop is made when the vehicle speed is the predetermined value or below, thereby enabling the vehicle stop to be easily predicted based on the vehicle speed of the vehicle.

According to the vehicle control device of the third aspect of the invention, the prediction of the vehicle stop is made when the vehicle speed V is the predetermined value V1 or below, thereby enabling the vehicle stop to be easily predicted based on the vehicle speed V of the vehicle.

According to the vehicle control device of the 4th aspect of the invention, the prediction of the vehicle stop is made when the vehicle deceleration is the predetermined value or above, thereby enabling the vehicle stop to be easily predicted by detecting the vehicle deceleration.

According to the vehicle control device of the 5th aspect of the invention, the driving force suppressing means switches the gear stage of the vehicle transmission to a high-speed gear stage side, whereby the vehicle driving force is suppressed so that the startup of the vehicle becomes dull even when the accelerator pedal is pressed down on.

According to the vehicle control device of the 6th aspect of the invention, the driving force suppressing means cancels the suppression of the vehicle driving force when restart of the vehicle is predicted, thereby preventing the lowering of the driving performance due to a suppression of the vehicle driving force.

According to the vehicle control device of the 7th aspect of the invention, the prediction of the vehicle restart is made when the vehicle speed is the predetermined value or above, thereby enabling the vehicle restart to be easily predicted based on the vehicle speed of the vehicle.

According to the vehicle control device of the 8th aspect of the invention, the prediction of the vehicle restart is made when the accelerator opening is the predetermined value or above, thereby enabling the vehicle restart to be easily predicted based on the accelerator opening.

According to the vehicle control device of the 9th aspect of the invention, the prediction of the vehicle restart is made when the brake is OFF-operated, thereby enabling the vehicle restart to be easily predicted based on the state of the brake.

Preferably, the high-speed gear stage is a gear stage at which a vehicle does not move suddenly even when the accelerator is pressed down on. This prevents a sudden movement of the vehicle in spite of the occurrence of the forward-reverse movement malfunction, thereby enabling the vehicle malfunction to be suppressed to a minimum.

MODE FOR CARRYING OUT THE INVENTION

An embodiment of the present invention will now be described in detail with reference to the drawings. It is to be noted in the following embodiment that figures are appropriately simplified or deformed with dimensional ratios and shapes of portions being not necessarily depicted in a correct manner.

Embodiment

Figures 1, 2:
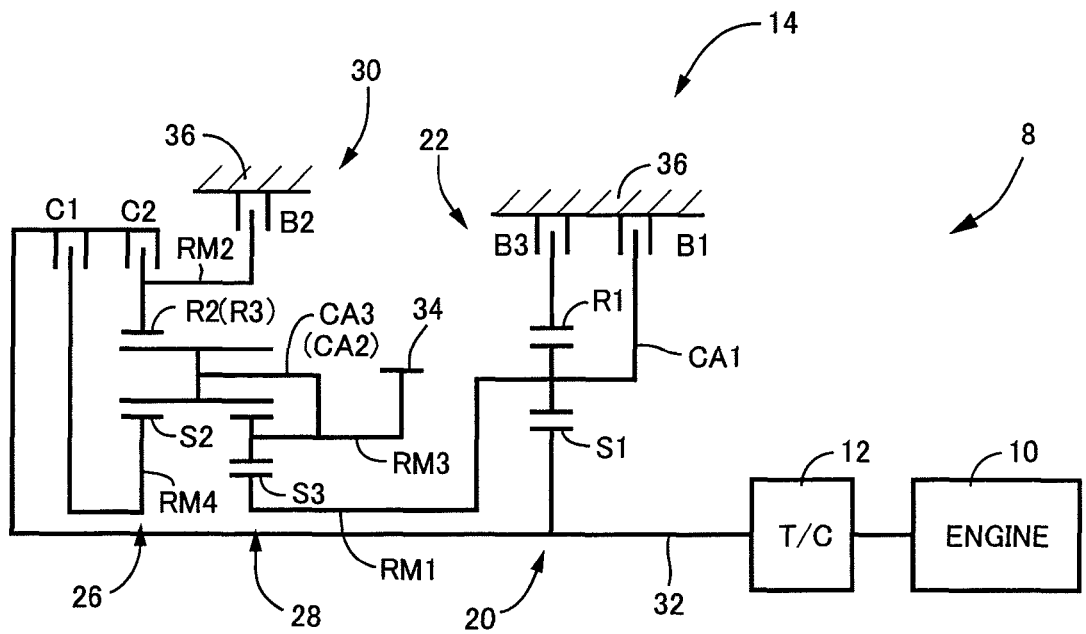
FIG. 1 is a diagrammatic view of a vehicle power transmitting device to which the present invention is preferably applied.
FIG. 2 is a diagram depicting an operation table for explaining relationships of engagement/disengagement between a plurality of gear stages and friction engagement elements of the automatic transmission of FIG. 1.

FIG. 1 is a diagrammatic view of a vehicle power transmitting device 8 of a transversely-mounted type for FF (Front engine Front drive) vehicle, etc. Referring to FIG. 1, the vehicle power transmitting device 8 includes a torque converter 12 that is a fluid coupling, and an automatic transmission 14 coupled to the torque converter 12, which torque converter 12 is in turn coupled to an engine 10 acting as a running drive-power source (motor) in the form of an internal combustion engine such as a gasoline engine or a diesel engine. Such a configuration allows the output of the engine 10 to be transmitted from a differential gear set not shown via the torque converter 12 and the automatic transmission 14 to driving wheels (front wheels). The automatic transmission 14 corresponds to a vehicle transmission of the present invention.

The automatic transmission 14 corresponding to the vehicle automatic transmission of the present invention coaxially has a first gear-shift portion 22 including as its main element a single-pinion type first planetary gear set 20, and a second gear-shift portion 30 including as its main elements a single-pinion type second planetary gear set 26 and a double-pinion type third planetary gear set 28, to change the rotation of an input shaft 32 for the output from an output gear 34. The input shaft 32 functions as an input member that is a turbine shaft of the torque converter 12 in this embodiment, while the output gear 34 functions as an output member that rotationally drives left and right driving wheels via the differential gear set. The automatic transmission 14 is configured substantially symmetrically with respect to its center axis. In FIG. 1, the lower half below the center axis thereof is invisible.

The first planetary gear set 20 making up the first gear-shift portion 22 includes three rotary elements, i.e., a sun gear S1, a carrier CA1, and a ring gear R1, with the sun gear S1 being coupled to the input shaft 32 to be rotationally driven, the ring gear R1 being non-rotatably fixed to a casing 36 via a third brake B3 to reduce, for output, the rotation of the carrier CA1 as an intermediate output member relative to the input shaft 32. The second planetary gear set 26 and the third planetary gear set 28 making up the second gear-shift portion 30 are partly coupled to each other to constitute four rotary elements RM1 to RM4. Specifically, a sun gear S3 of the third planetary gear set 28 constitutes the first rotary element RM1, a ring gear R2 of the second planetary gear set 26 and a ring gear R3 of the third planetary gear set 28 are coupled to each other to constitute the second rotary element RM2, a carrier CA2 of the second planetary gear set 26 and a carrier CA3 of the third planetary gear set 28 are coupled to each other to constitute the third rotary element RM3, and a sun gear S2 of the second planetary gear set 26 constitutes the fourth rotary element RM4. The second planetary gear set 26 and the third planetary gear set 28 are a Ravigneaux type planetary gear train in which the carriers CA2 and CA3 are formed from a common member, the ring gears R2 and R3 being formed from a common member, with a pinion gear of the second planetary gear set 26 serving also as a second pinion gear of the third planetary gear set 28.

The first rotary element RM1 (sun gear S3) is coupled selectively by the first brake B1 to the casing 36 to stop the rotation, the second rotary element RM2 (ring gears R2 and R3) is coupled selectively by the second brake B2 to the casing 36 to stop the rotation, the fourth rotary element RM4 (sun gear S2) is coupled selectively via a first clutch C1 to the input shaft 32, the second rotary element RM2 (ring gears R2 and R3) is coupled selectively via a second clutch C2 to the input shaft 32, the first rotary element RM1 (sun gear S3) is coupled integrally to the carrier CA1 of the first planetary gear set 20 that is the intermediate output member, and the third rotary element RM3 (carriers CA2 and CA3) is coupled integrally to the output gear 34, to output the rotation.

The clutches C1 and C2 and the brakes B1, B2, and B3 (hereinafter, referred to simply as clutch C and brake B, respectively, unless specifically distinguished) are hydraulic friction engagement devices such as multi-disc clutches and multi-disc brakes whose engagements are controlled by hydraulic actuators, and are subjected to their respective engagement-disengagement controls by a hydraulic control circuit 40 depicted in FIG. 3 so as to establish gear stages consisting of six stages of forward movement and one stage of reverse movement according to a shift operating position of a shift lever 66 (see FIG. 3) as shown in FIG. 2. "1st" to "6th" of FIG. 2 means first-speed gear stage to sixth-speed gear stage of the forward movement, respectively, and "Rev" means a reverse movement gear stage. Change gear ratios (=input shaft rotational speed $N_{IN}$/output shaft rotational speed $N_{OUT}$) thereof are appropriately defined by gear ratios p1, p2, and p3 of the first planetary gear set 20, the second planetary gear set 26, and the third planetary gear set 28, respectively. "O" of FIG. 2 represents an engagement, and the blank represents a disengagement.

Figure 3:
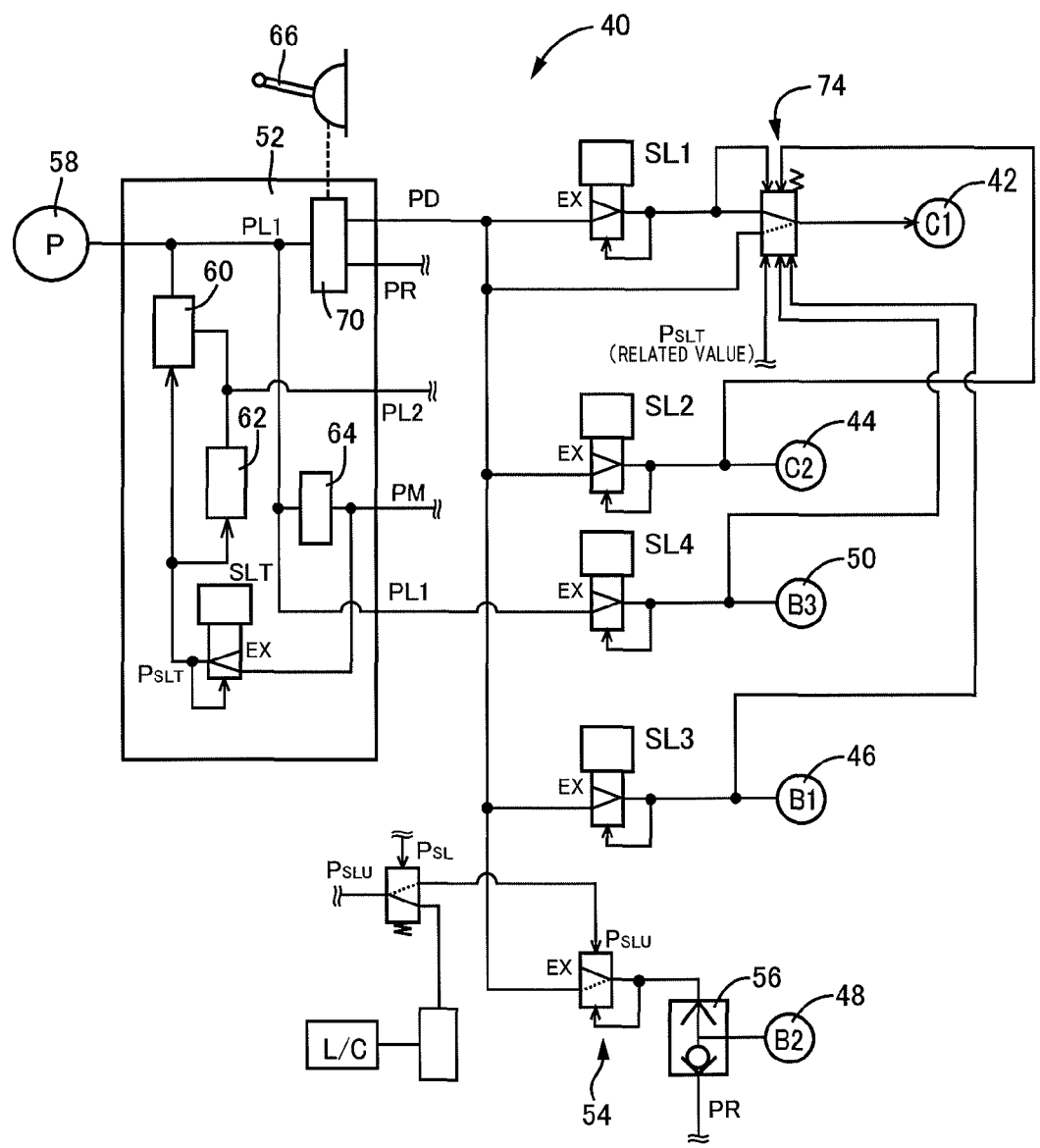
FIG. 3 is a circuit diagram depicting portions relating to an oil pressure supply device, clutches C1 and C2, and brakes B1 to B3, of a hydraulic control circuit included in the vehicle power transmitting device of FIG. 1.

FIG. 3 is a circuit diagram related to linear solenoid valves SL1 to SL4 that control operations of the hydraulic actuators of the clutch C and the brake B, etc., the circuit diagram depicting an essential part of the hydraulic control circuit 40.

Referring to FIG. 3, hydraulic actuators (hydraulic cylinders) 42, 44, and 46 of the clutches C1 and C2 and the brake B1, respectively, are supplied with D-range pressures PD (forward driving range pressures, forward movement oil pressures) that are output from an oil pressure supply device 52 and regulated by the linear solenoid valves SL1, SL2, and SL3, respectively, while a hydraulic actuator 50 of the brake B3 is supplied with a line oil pressure PL1 that is output from the oil pressure supply device 52 and regulated by the linear solenoid valve SL4. A hydraulic actuator 48 of the brake B2 is supplied via a shuttle valve 56 with an oil pressure in the form of either one of an output oil pressure and a reverse pressure PR (reverse driving range pressure, reverse movement oil pressure) from a second brake control valve 54.

The oil pressure supply device 52 includes a primary regulator valve (first pressure regulation valve) 60, a secondary regulator valve (second pressure regulation valve) 62, a linear solenoid valve SLT, a modulator valve 64, a manual valve 70, etc., for the supply of the line oil pressure PL1, a line oil pressure PL2, a modulator oil pressure PM, the D-range pressure PD, and the reverse pressure PR. The primary regulator valve 60 is of a relief type for example and regulates the line oil pressure PL1 (first line oil pressure PL1) originating from an oil pressure generated from a mechanically-operated oil pump 58 that is rotationally driven by the engine 10. The secondary regulator valve 62 regulates the line oil pressure PL2 (second line oil pressure PL2, secondary pressure PL2) originating from an oil pressure discharged from the first pressure regulation valve 60 for the regulation of the line oil pressure PL1 by the first pressure regulation valve 60. The linear solenoid valve SLT feeds a signal pressure $P_{SLT}$ to the first pressure regulation valve 60 and the second pressure regulation valve 62 so that the line oil pressures PL1 and PL2 are regulated depending on an engine load, etc., represented by an accelerator opening $A_{CC}$ or a throttle valve opening $\theta_{TH}$. The modulator valve 64 regulates to a certain value the modulator oil pressure PM originating from the line oil pressure PL1. The manual valve 70 outputs the line oil pressure PL1 as the D-range pressure PD when a shift lever 66 is operated to "D" position or "B" position and as the reverse pressure PR when operated to "R" position, the line oil pressure PL1 being input by switching of oil paths through activating an SBW actuator 68 (see FIG. 5) with an operation of the shift lever 66 electrically coupled via a wire thereto.

The linear solenoid valves SL1 to SL4, and SLT have fundamentally the same configuration and are independently excited or not excited by an electronic control device so that the oil pressures of the hydraulic actuators 42, 44, 46, and 50 are independently controllably regulated to control the engagement pressures of the clutches C1 and C2, and the brakes B1 and B3. The predefined engagement devices as depicted in the engagement operation table of FIG. 2 for example are engaged to establish shift stages of the automatic transmission 14. The shift control executed in the automatic transmission 14 is a so-called clutch-to-clutch shift in which, for instance, the disengagement and engagement of the clutch C and the brake B related to the shift are controlled at the same time. In case of upward shifting from a second speed to a third speed as depicted in the engagement operation table of FIG. 2 for example, the brake B1 is disengaged simultaneously with the engagement of the brake B3, and a disengagement transient oil pressure of the brake B1 and an engagement transient oil pressure of the brake B3 are properly controlled to suppress the shift shock. Since the engagement devices (clutch C and brake B) of the automatic transmission 14 are separately controlled by the linear solenoid valves SL1 to SL4 in this manner, the operational responsibility of the engagement devices is improved. Simplification is also achieved of the hydraulic circuit for the engagement/disengagement operations of the engagement devices.

Figure 4:
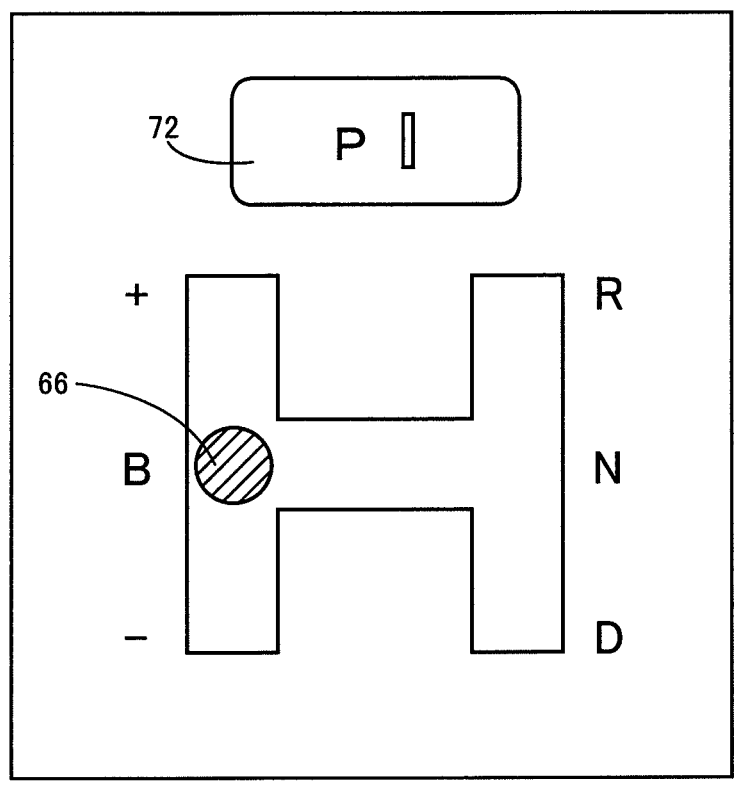
FIG. 4 is a diagram for explaining operational positions in a shift lever of FIG. 3.

The shift lever 66 is disposed in the vicinity of the driver's seat for example, and, as depicted in FIG. 4, is operated in an H-shaped pattern to three positions, i.e., "R" position, "N" position, and "D" position arranged in a front-to-rear (longitudinal) direction of a vehicle and to "+" position, "B" position and "−" position for manual operation arranged in parallel thereto. This embodiment further includes as a separate switch a P-operation button 72 for operation to "P" position to perform a parking lock. The shift lever 66 is a momentary type to automatically return at all times to its neutral position depicted in the diagram.

The "R" position is a reverse driving position for reversing the rotational direction of the output gear 34 of the automatic transmission 14; the "N" position is a neutral position for providing a neutral state where a power transmission is interrupted within the automatic transmission 14; the "D" position is a forward driving position for executing automatic shift control using all the forward movement gear stages of the first gear stage "1st" to the sixth gear stage "6th" within the driving range (D range) permitting the shift of the automatic transmission 14; and the "B" position is a forward driving position enabling a manual shift by switching plural different driving ranges restricting the range of change of the gear stages, that is, by switching plural different driving ranges of different gear stages on the high-vehicle-speed side. The "P" position selected by the operation of the P-operation button 72 is a parking position to provide a neutral state where a power transmission path is released within the automatic transmission 14, i.e., where a power transmission is interrupted within the automatic transmission 14 and to mechanically stop (parking lock) the rotation of the output gear 34 by a parking lock mechanism not shown.

The "B" position is provided with "+" position for shifting the driving range upward for each operation of the shift lever 66 and with "−" position for shifting the driving range downward for each operation of the shift lever 66. For example, in the "B" position, any one of "6" range to "L" range is varied in response to an operation of the shift lever 66 to the "+" position or to the "−" position. The "L" range in the "B" position is also an engine brake range for acquiring a further engine brake effect in conjunction with the engagement of the second brake B2 at the first gear stage "1st".

The "D" position is also a shift position selecting an automatic shift mode that is a control mode in which the automatic shift control is executed within a shiftable range e.g., within the range of the first gear stage to the sixth gear stage of the automatic transmission 14 as depicted in FIG. 2 for example. The "B" position is also a shift position selecting a manual shift mode that is a control mode in which the automatic shift control is executed within a range not exceeding the highest-speed gear stage of each of the driving ranges of the automatic transmission 14 and in which the manual shift control is executed based on a driving range (i.e., highest-speed gear stage) changed by a manual operation of the shift lever 66.

Referring back to FIG. 3, before the hydraulic actuator 42 of the clutch C1, i.e., between the linear solenoid valve SL1 and the hydraulic actuator 42 is disposed a fail-safe valve 74 for preventing the power transmission path of the automatic transmission 14 from being abruptly interrupted (torque loss) due to some trouble during the running. When no oil pressure is supplied to the hydraulic actuator 42 due to a trouble of the linear solenoid valve SL1 for example, the fail-safe valve 74 supplies the D-range pressure PD to the hydraulic actuator 42 to thereby prevent the interruption (torque loss) of the power transmission of the automatic transmission 14 during the running. The fail-safe valve 74 is disposed due to the reason that the vehicle may become unstable with its impaired operability when the power transmission path of the automatic transmission 14 is interrupted during the running.

Figure 5:
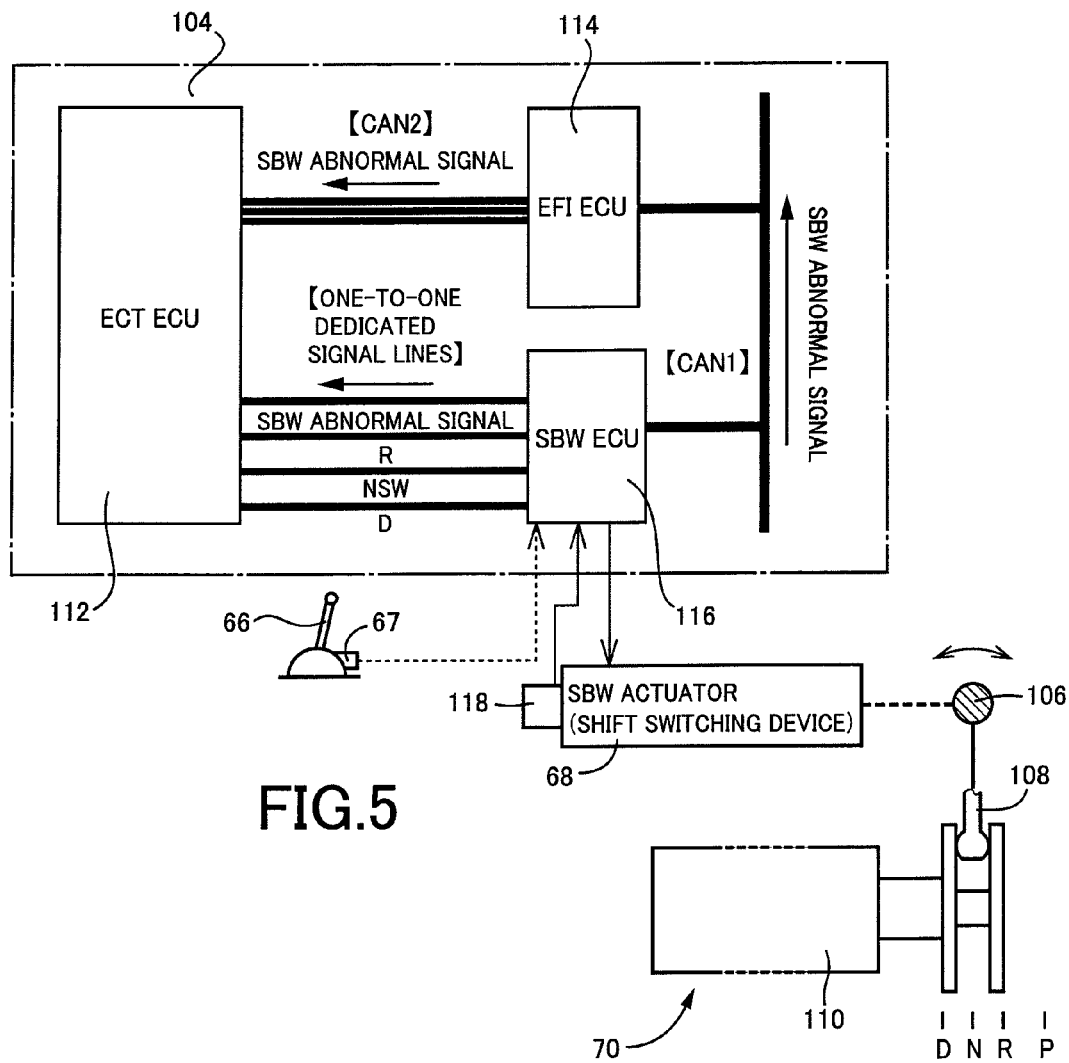
FIG. 5 is a block diagram for explaining a control system for electrically switching the shift position of the manual valve in response to the driver's operation of the shift lever in the automatic transmission.

FIG. 5 is a block diagram for explaining a control system of the shift-by-wire system that electrically switches the shift position of the manual valve 70 in response to the driver's operation of the shift lever 66 in the automatic transmission 14. When the shift position of the shift lever 66 is switched by the driver, an electrical signal corresponding to the shift position is fed via a shift position sensor 67 to an electronic control device 104. A range switching signal output from the electronic control device 104 (SBW-ECU116) controls an SBW actuator 68 whereby a switching shaft 106 is rotated around its axis so that a spool 110 of the manual valve 70 is mechanically moved via a lever 108 in one linear direction to be positioned at the four shift positions "P", "R", "N", and "D" for switching of the oil paths. A rotational position of the SBW actuator 68 is detected, for instance, by a neutral start switch 118 (hereinafter, described as NSW switch 118) so that the SBW actuator 68 is feedback controlled based on the rotational position detected from the NSW switch 118. The SBW actuator 68 corresponds to a shift switching device of the present invention.

The electronic control device 104 of this embodiment includes an ECT-ECU 112 that is configured to be integrally constituted of a control device for controlling the engine 10 and a control device for controlling the automatic transmission 14; an EFI-ECU 114 that provides a control so as to ensure a proper fuel injection based on a basic injection time that is calculated depending on the state of the engine 10 and that is corrected using signals from sensors; and the SBW-ECU 116 that controls the shift-by-wire system. The ECT-ECU 112 and the SBW-ECU 116 are linked together by a plurality of separate wires (electric wires) through which are communicated an SBW abnormal signal issued e.g., when the SBW actuator 68 goes wrong, an R signal indicating that the shift position of the shift lever 66 is switched to the "R" range, an NSW signal indicative of the driving range of the automatic transmission 14, a D signal indicating that the shift position of the shift lever 66 is switched to the "D" range. The ECT-ECU 112 and the SBW-ECU 116 are capable of communicating information with each other by way of the EFI ECU 114. In this case, between the SBW-ECU116 and the EFI-ECU 114, and between the EFI-ECU 114 and the ECT-ECU 112 is employed a so-called CAN communication that is a multiplex communication system enabling a plurality of information communications by a single communication line.

In the electronic control device 104 thus configured, for instance, when the SBW-ECU 116 detects a failure of the SBW actuator 68, etc., the SBW-ECU 116 outputs the SBW abnormal signal directly to the ECT-ECU 112 and via the EFI-ECU 114 to the ECT-ECU 112. By outputting the SBW abnormal signal through two different lines in this manner, the SBW abnormality is securely transmitted to the ECT-ECU 112 since even when one communication line is disconnected, the SBW abnormal signal is transmitted to the ECT-ECU 112 through the other communication line.

Figure 6:
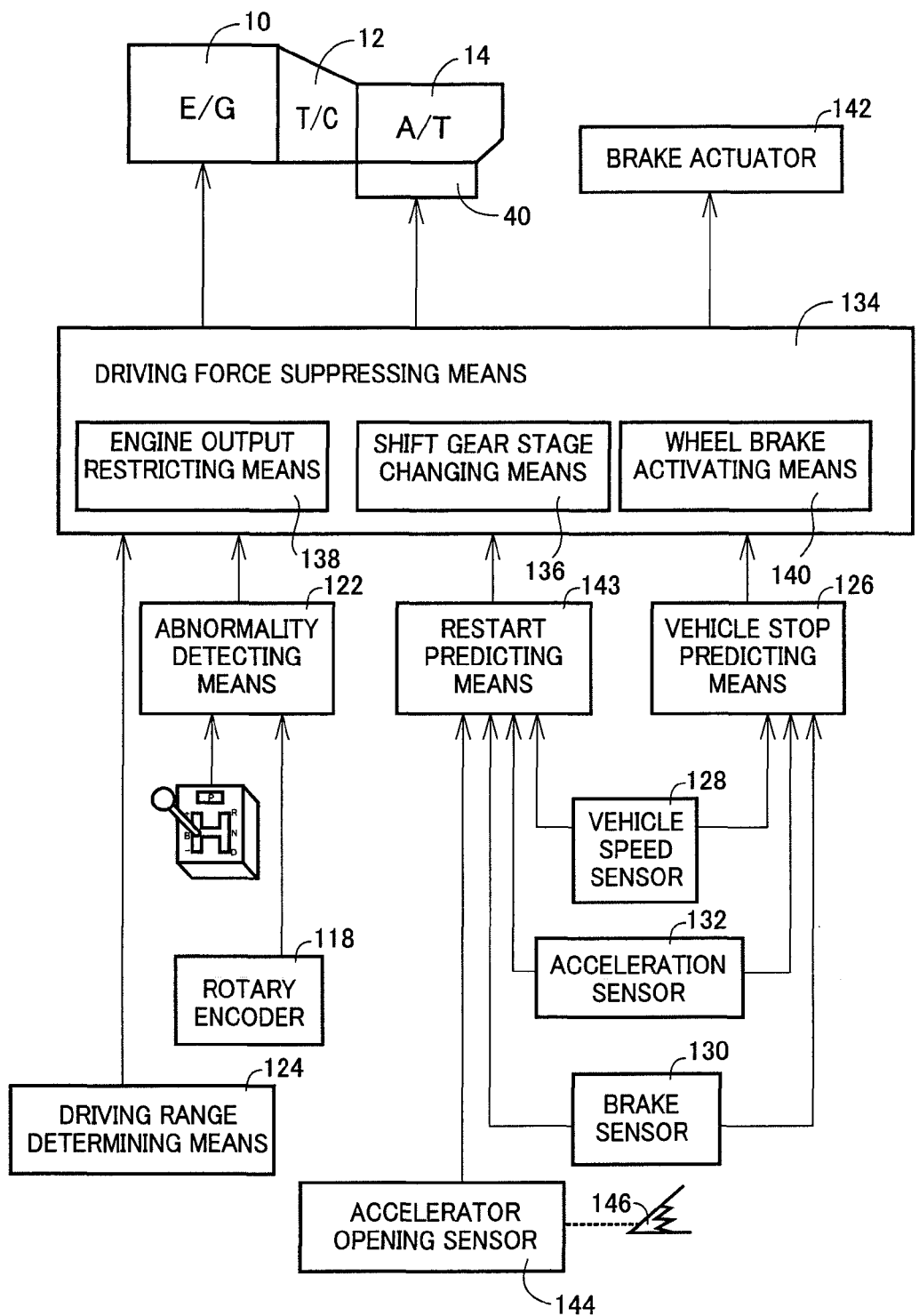
FIG. 6 is a function block diagram explaining major portions for control operations effected by the electronic control device.

FIG. 6 is a function block diagram explaining major portions for control operations effected by the electronic control device 104. An abnormality detecting means 122 detects an abnormality in the shift-by-wire system. For example, when a shift switching operation is performed, if the driving range determined based on a range switching signal output from the shift position sensor 67 differs from the driving range determined based on a position signal output from the NSW switch 118, then an abnormality in the shift-by-wire system is detected. Similarly, detection is made of an abnormality in the shift-by-wire system also when a position voltage (position signal) from the NSW switch 118 does not vary in spite of outputting a driving signal to the SBW actuator 68, or when no signals are output from the shift position sensor 67, the NSW switch 118, and the SBW-ECU 116 that synthetically controls the shift-by-wire system.

A driving range determining means 124 determines whether or not an actual driving range of the automatic transmission 14 is the "D" range that is a forward driving range. The driving range determining means 124 determines whether the automatic transmission 14 is at the "D" range or not based on a position signal (position voltage) detected from the NSW switch 118 for example. And, the driving range determining means 124 may, for instance, detect a D-range pressure PD that is a forward driving range pressure by use of a previously-provided hydraulic sensor not shown, and, if the D-range pressure PD is a predetermined value or above, then it may determine the driving range to be "D" range. Furthermore, the driving range determining means 124 may detect engagement pressures of the clutches C1 and C2 at least one of which is engaged upon the forward movement by use of a hydraulic sensor not shown, and, if at least one of the detected engagement pressures of the clutches C1 and C2 is a predetermined value or above, then it may determine the driving range to be "D" range.

A vehicle stop predicting means 126 predicts whether a vehicle comes to a stop or not. The vehicle stop predicting means 126 detects a vehicle speed V based on a vehicle speed sensor 128 that detects the output shaft rotational speed of the automatic transmission 14 to determine whether or not the vehicle speed V is a predetermined value V1 or below. The predetermined value V1 is e.g., experimentally set in advance and is set to a low speed value whereby the vehicle is predicted to come to a stop. The vehicle stop predicting means 126 determines whether a foot brake is ON-operated based on a brake switch signal, etc., detected from a brake sensor 130 disposed on the foot brake. The vehicle stop predicting means 126 detects a deceleration of a vehicle by use of an acceleration sensor 132 that detects an acceleration of a vehicle, to determine whether or not a deceleration $G_R$ of the vehicle is a predetermined value $G_R1$ or above. The predetermined value $G_R1$ is e.g., experimentally set in advance and is set to a value whereby the vehicle is predicted to come to a stop. The predetermined value $G_R1$ is not limited to a fixed value, but it may be varied depending on the vehicle speed V. The vehicle stop predicting means 126 predicts that the vehicle will come to a stop when the vehicle speed V is the predetermined value V1 or below, when the foot brake is ON, and when the deceleration $G_R$ is the predetermined value $G_R1$ or above. By predicting whether the vehicle comes to a stop or not, the vehicle stop predicting means 126 functions also as a means for predicting whether or not the driver executes a forward/reverse movement switching operation to switch the direction of movement of the vehicle. The forward/reverse movement switching operation is generally executed when a vehicle stops or when a vehicle goes slow such that the vehicle is almost stopping. Thus, the vehicle stop predicting means 126 predicts a stop of the vehicle from the vehicle speed V, the state of the brake, the deceleration occurring at the vehicle, etc., and, if conditions for a vehicle stop are met, then it predicts the driver's execution of the forward/reverse movement switching operation.

A driving force suppressing means 134 suppresses a driving force of a vehicle when an abnormality of the shift-by-wire system is detected by the abnormality detecting means 122 and when a stop of the vehicle is predicted by the vehicle stop predicting means 126. The driving force suppressing means 134 is configured to include a shift gear stage changing means 136, an engine output restricting means 138 and a wheel brake activating means 140. The shift gear stage changing means 136 switches the gear stage of the automatic transmission 14 to the high-speed gear stage to thereby suppress the vehicle driving force. In this case, the gear stage to be selected of the automatic transmission 14 is previously experimentally set and is set to such a high-speed gear stage as not to allow an abrupt movement of a vehicle even when the accelerator pedal is pressed down on and as not to cause an engine stall. The high-speed gear stage is appropriately changed to a proper shift stage meeting the above conditions, based on the states of a vehicle such as the vehicle speed V of the vehicle for example.

The engine output restricting means 138 restricts an engine output by e.g., executing a suppression of the amount of fuel injection of the engine 10 and a suppression of the throttle valve opening. The wheel brake activating means 140 drives a brake actuator 142 to activate a wheel brake not shown, to thereby suppress the vehicle driving force. The driving force suppressing means 134 thus suppresses the vehicle driving force through e.g., the operation of the shift gear stage changing means 136 in conjunction with the operations of the engine output restricting means 138 and the wheel brake activating means 140.

The driving force suppressing means 134 is implemented when the vehicle is predicted to come to a stop with the detection of an abnormality by the abnormality detecting means 122 during the running for example. The driving force suppressing means 134 suppresses the driving force by implementing the engine output restricting means 138 and the wheel brake activating means 140 together with the shift gear stage changing means 136. When it is not possible to implement the shift gear stage changing means 136 due to e.g., a failure of the SBW actuator 68, the suppression of the driving force is achieved by the engine output restricting means 138 and the wheel brake activating means 140.

When an abnormality of the shift-by-wire system detected by the abnormality detecting means 122 is the forward/rearward movement malfunction, the vehicle may possibly run in a direction opposite to that of the driver's intention in spite of the execution of the forward/reverse switching operation. Then, because the vehicle driving force is previously suppressed by the driving force suppressing means 134, the startup of the vehicle becomes dull even when the accelerator pedal is pressed down on with the occurrence of the forward/rearward movement malfunction. This helps the driver to notice the abnormality before a substantial movement of the vehicle.

A restart predicting means 143 predicts whether a vehicle again starts running or not such as when the vehicle speed V of the vehicle is a predetermined value V2 or above, when the accelerator opening $A_{CC}$, i.e., the amount of operation (the amount of depression) of an accelerator pedal 146 is a predetermined value $A_{CC}1$ or above, and when the foot brake is OFF-operated. The predetermined value V2 and the predetermined value $A_{CC}1$ are e.g., experimentally set in advance and are respectively set to be values whereby the vehicle is predicted to restart. When a restart of the vehicle is predicted based on the restart predicting means 143, the driving force suppressing means 134 cancels the suppression of the vehicle driving force that has hitherto continued. If the suppression of the vehicle driving force is continued after the restart by the driving force suppressing means 134, the vehicle take-off performance and driving performance will become worse. Thus, by canceling the action of the driving force suppressing means 134 based on the prediction by the restart predicting means 143, the take-off performance and the driving performance are restored to their respective normal states.

Figure 7:
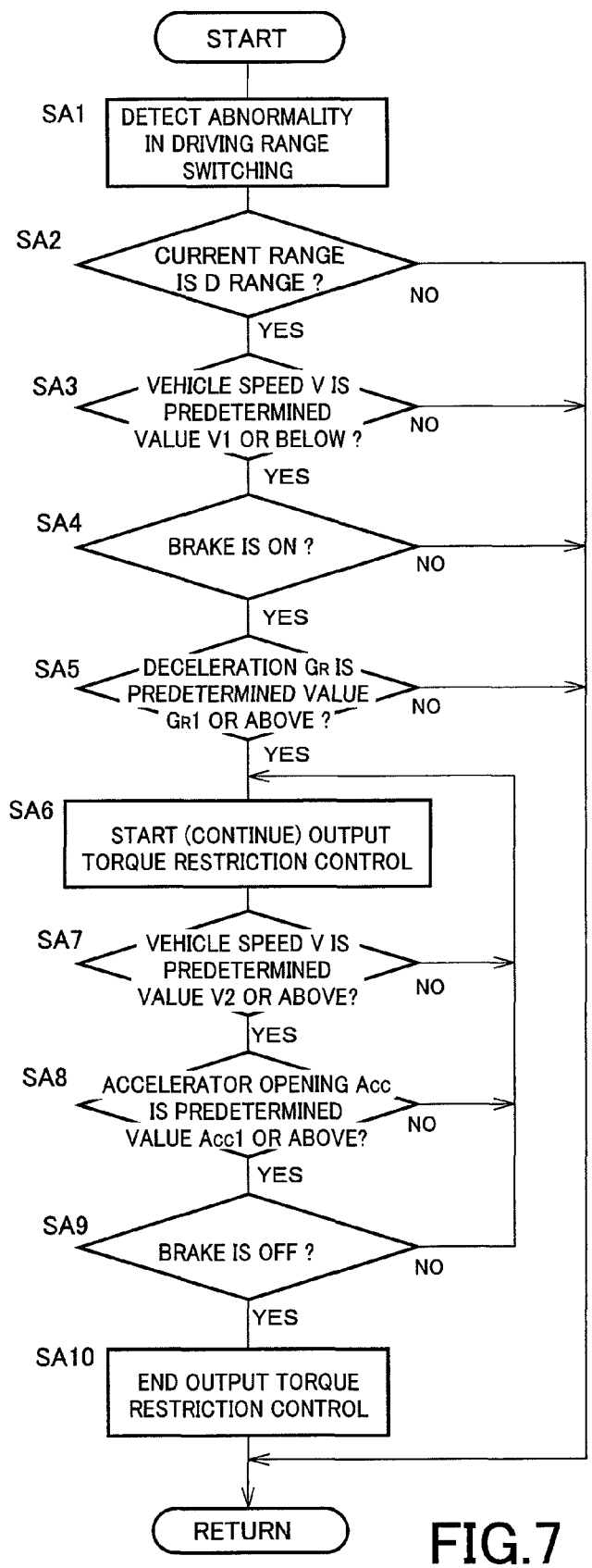
FIG. 7 is a flowchart for explaining principal control actions of the electronic control device of the present invention, that is, control actions capable of suppressing a vehicle movement attributable to the forward/reverse movement malfunction when executing the forward/reverse movement switching operation under the state where an abnormality occurs in the shift-by-wire system.

FIG. 7 is a flowchart for explaining principal control actions of the electronic control device 104 of the present invention, that is, control actions capable of suppressing a vehicle movement attributable to the forward/reverse movement malfunction when executing the forward/reverse movement switching operation under the state where an abnormality occurs in the shift-by-wire system. The control actions are executed in an extremely short cycle of time in the order of several milliseconds to several tens of milliseconds for example.

First, at step SA1 (hereinafter, the word "step" will be omitted) corresponding to the abnormality detecting means 122, an abnormality of the shift-by-wire system is detected during the running. It is assumed at SA1 that there occurs a forward/reverse movement malfunction in which, when the driver has executed a forward/reverse movement switching operation to switch the driving range from "D" range to "R" range during the time when the vehicle goes slow for example, the actual driving range of the automatic transmission 14 is not switched to "R" range. Accordingly, at SA1, the driving range based on the shift position sensor 67 does not coincide with the driving range based on the NSW switch 118, thereby detecting an abnormality in the shift-by-wire system.

It is then determined at SA2 corresponding to the driving range determining means 124 whether or not the actual driving range of the automatic transmission 14 is "D" range that is a forward driving range, in other words, is in the state of engagement corresponding to any one of the first-speed gear stage to the sixth-speed gear stage. Then, at SA3 to SA5 corresponding to the vehicle stop predicting means 126, it is determined whether the vehicle is stopped or not. Specifically, each of the determination is made based on the vehicle speed V at SA3, based on the state of operation of the brake at SA4, and based on the deceleration $G_R$ at SA5. If any one of SA3 to SA5 is negated, then determination is made of being in a (reverse inhibit) state where, even when the driver executes a forward/reverse movement switching operation (switching to "R" range), the switching is not permitted, ending the routine.

On the other hand, if all of SA3 to SA5 are affirmed, the vehicle driving force is promptly suppressed at SA6 corresponding to the driving force suppressing means 134. As a result, the startup of the vehicle becomes dull, and the vehicle hardly moves even when a forward/reverse movement malfunction occurs. Thus, the driver notices the abnormality before a substantial movement of the vehicle.

At SA7 to SA9 corresponding to the restart predicting means 143, the suppression of the driving force is cancelled when the driver notices the above abnormality of being the forward/reverse movement malfunction at SA6, specifically a fact that the automatic transmission 14 is not switched to "R" range and when for example the driver executes the switching to "D" range to restart the vehicle. Specifically, it is determined at SA7 whether the vehicle speed V reaches a predetermined value V2 or above. At SA8, it is determined whether the accelerator opening $A_{CC}$ is a predetermined value $A_{CC}1$ or above. At SA9, it is determined whether the footbrake is OFF-operated. If any one of SA7 to SA9 is negated, then the procedure returns to SA6 to continue the suppression of the driving force. On the contrary, if all of SA7 to SA9 are affirmed, then a prediction is made that the vehicle will again start moving in a forward movement direction, and at SA10 corresponding to the driving force suppressing means 134, the driving force suppression is cancelled.

Although the flowchart explained above is an example in which an abnormality (forward/reverse movement malfunction) occurs in the shift-by-wire system when the driver actually switches the driving range from "D" range" to "R" range upon the vehicle's going slow, it is applicable to the case described below where an abnormality occurs in the shift-by-wire system during running at "D" range.

When at SA1 an abnormality of the shift-by-wire system is detected due to a failure of the SBW-ECU 116 for example during running at "D" range, prediction of a vehicle stop is carried out at SA3 to SA5. At that time, if the vehicle stop is not predicted, then it is determined that the forward/reverse movement switching operation is not performed by the driver, with the result that the suppression of the vehicle driving force is not executed, ending the routine. This prevents lowering of the driving performance attributable to the suppression of the driving force during running. On the contrary, if the vehicle stop is predicted based on SA3 to SA5, then the vehicle driving force is suppressed at SA6. As a result, the startup of the vehicle becomes dull, so that even when the driver's forward/reverse movement switching operation is executed, the driver notices the abnormality before a substantial movement of the vehicle. Furthermore, if the restart of the vehicle is predicted based on SA7 to SA9 with the driving force suppressed at SA6, the suppression of the vehicle driving force is cancelled at SA10. This suppresses lowering of the driving performance.

According to this embodiment, as described hereinabove, in cases where an abnormality is detected in the shift-by-wire system and where a vehicle stop is predicted, the suppression of the driving force is carried out only when the vehicle stop is predicted, due to the provision of the driving force suppressing means 134 for suppressing the vehicle driving force. The vehicle forward/reverse movement switching operation may be performed when the vehicle is in standstill. By virtue of the suppression of the vehicle driving force by the driving force suppression means 134, however, even when the forward/reverse movement switching malfunction occurs due to an abnormality of the shift-by-wire system when the forward/reverse movement switching operation is performed, the startup of the vehicle becomes dull and the vehicle movement is hardly occurred caused by the forward/reverse movement malfunction in spite of the driver's depression of the accelerator. This enables the driver to notice the abnormality while suppressing the vehicle movement to a minimum. Furthermore, when the vehicle stop is not predicted, the vehicle driving force is not suppressed with a determination that the forward/reverse movement switching operation is not performed so that the running state continues, to thereby prevent lowering of vehicle driving performance attributable to a reduction of the driving force.

According to this embodiment, the prediction of the vehicle stop is made when the vehicle speed V is the predetermined value V1 or below, thereby enabling the vehicle stop to be easily predicted based on the vehicle speed V of the vehicle.

According to this embodiment, the prediction of the vehicle stop is made when the brake is ON-operated, thereby enabling the vehicle stop to be easily predicted based on the state of the brake.

According to this embodiment, the prediction of the vehicle stop is made when the vehicle deceleration $G_R$ is the predetermined value $G_R1$ or above, thereby enabling the vehicle stop to be easily predicted by detecting the vehicle deceleration $G_R$.

According to this embodiment, the driving force suppressing means 134 switches the gear stage of the automatic transmission 14 to a high-speed gear stage side, whereby the vehicle driving force is suppressed so that the startup of the vehicle becomes dull even when the accelerator pedal is pressed down on.

According to this embodiment, the driving force suppressing means 134 cancels the suppression of the vehicle driving force when restart of the vehicle is predicted, thereby preventing lowering of the driving performance due to a reduction of the vehicle driving force.

According to this embodiment, the prediction of the vehicle restart is made when the vehicle speed V is the predetermined value V2 or above, thereby enabling the vehicle restart to be easily predicted based on the vehicle speed V of the vehicle.

According to this embodiment, the prediction of the vehicle restart is made when the accelerator opening $A_{CC}$ is the predetermined value $A_{CC}1$ or above, thereby enabling the vehicle restart to be easily predicted based on the accelerator opening $A_{CC}$.

According to this embodiment, the prediction of the vehicle restart is made when the brake is OFF-operated, thereby enabling the vehicle restart to be easily predicted based on the state of the brake.

Although the embodiment of the present invention has hereinabove been described in detail with reference to the drawings, the present invention is applicable in the other modes.

For example, although in the above embodiment, the automatic transmission 14 is a 6-speed forward/1-speed reverse automatic transmission, the type of the transmission is not limited thereto. For example, in the stepped automatic transmission, the number of the gear-shift stages is unlimited and the internal linkage is not particularly limited. The present invention is also applicable to a continuously variable transmission such as a belt-type continuously variable transmission since its driving force can be suppressed by shifting the gear ratio to a higher gear. The present invention is further applicable to a manual transmission employing the shift-by-wire system.

Although the above embodiment employs as the specific means for predicting the vehicle stop the vehicle speed V, the state of brake, and the deceleration $G_R$ so that the vehicle is predicted to come to a stop when the above means satisfy their respective vehicle stop conditions, not all the above predicting means are indispensable requirements, and, for example, the vehicle stop prediction based on the deceleration $G_R$ may be omitted or the vehicle stop prediction may be made based on only the vehicle speed V.

Although the above embodiment employs as the specific means for predicting the vehicle restart the vehicle speed V, the state of brake, and the accelerator opening $A_{CC}$ so that the vehicle is predicted to restart when the above means satisfy their respective vehicle restart conditions, not all the above predicting means are indispensable requirements, and, for example, the vehicle restart prediction based on the accelerator opening $A_{CC}$ may be omitted or the vehicle restart prediction may be made based on only the vehicle speed V.

Although description of the above embodiment is made of an exemplary case where switching is made from the forward driving range to the reverse driving range, the present invention is not limited to the switching to the reverse driving range but instead it is also applicable to switching to the forward driving range.

Although in the above embodiment, the driving range is detected based on the position voltage of the NSW switch 118, the driving range may be detected from another rotational position detecting device such as a rotary encoder for example without being limited to the NSW switch 118.

Although in the above embodiment, the driving force suppressing means 134 suppresses the driving force by appropriately combining the shift gear stage changing means 136 with the engine output restricting means 138 and the wheel brake activating means 140, the suppression may be achieved, for instance, by only the shift gear stage changing means 136 or by only the engine output restricting means 138. That is, the above means may be appropriately employed solely or in combination as long as the vehicle driving force is suppressed.

It is to be understood that the above is merely one embodiment and that the present invention may be carried out in variously altered or modified manners based on the knowledge of those skilled in the art.

THE EXPLANATION OF SIGNS

14: automatic transmission (vehicle transmission)
68: SBW actuator (shift switching)
122: abnormality detecting means
134: driving force suppressing means

The invention claimed is:

1. A vehicle control device having a shift-by-wire system that switches a driving range of a vehicle transmission by inputting a range switching signal to a shift switching device, comprising:
    an abnormality detecting portion configured to detect an abnormality that the shift switching device cannot switch the driving range, of the shift-by-wire system; and
    a driving force suppressing portion configured to suppress a driving force of a vehicle when an abnormality is detected in the shift-by-wire system and when a vehicle stop is predicted, and
    the driving force suppressing portion switching a gear stage of the vehicle transmission to a higher-speed gear stage.

2. The vehicle control device of claim 1, wherein a prediction of the vehicle stop is made when a vehicle speed is a predetermined value or below.

3. The vehicle control device of claim 1, wherein a prediction of the vehicle stop is made when a brake is ON-operated.

4. The vehicle control device of claim 1, wherein
    a prediction of the vehicle stop is made when a vehicle deceleration is a predetermined value or above.

5. The vehicle control device of claim 1, wherein the driving force suppressing portion cancels the suppression of the driving force of the vehicle when a restart of the vehicle is predicted.

6. The vehicle control device of claim 5, wherein a prediction of the restart of the vehicle is made when a vehicle speed of the vehicle is a predetermined value or above.

7. The vehicle control device of claim 5, wherein a prediction of the restart of the vehicle is made when an accelerator opening is a predetermined value or above.

8. The vehicle control device of claim 5, wherein a prediction of the restart of the vehicle is made when a brake is OFF-operated.

\* \* \* \* \*